(12) United States Patent
Wolleschensky et al.

(10) Patent No.: US 7,728,270 B2
(45) Date of Patent: Jun. 1, 2010

(54) MICROSCOPY METHOD AND MICROSCOPE INCLUDING TWO DETECTIONS

(75) Inventors: Ralf Wolleschensky, Jena (DE); Michael Kempe, Kunitz (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 16 days.

(21) Appl. No.: 12/088,410

(22) PCT Filed: Sep. 14, 2006

(86) PCT No.: PCT/EP2006/008943

§ 371 (c)(1),
(2), (4) Date: Mar. 27, 2008

(87) PCT Pub. No.: WO2007/036303

PCT Pub. Date: Apr. 5, 2007

(65) Prior Publication Data

US 2009/0128898 A1 May 21, 2009

(30) Foreign Application Priority Data

Sep. 29, 2005 (DE) .................... 10 2005 046 753

(51) Int. Cl.
*H01L 27/00* (2006.01)
(52) U.S. Cl. .................... 250/208.1; 250/201.3
(58) Field of Classification Search .......... 250/208.1, 250/201.3, 201.7, 201.8, 458.1, 459.1; 359/379–383, 359/368; 356/124, 603–607
See application file for complete search history.

(56) References Cited

U.S. PATENT DOCUMENTS

| 5,510,894 A | 4/1996 | Batchelder et al. |
| 6,388,809 B1 | 5/2002 | MacAulay |
| 6,819,415 B2 * | 11/2004 | Gerstner et al. ............. 356/124 |

FOREIGN PATENT DOCUMENTS

| DE | 692 03 830 T2 | 11/1995 |
| EP | 0 485 803 A1 | 5/1992 |
| GB | 2 216 744 A | 10/1989 |

* cited by examiner

*Primary Examiner*—Que T Le
(74) *Attorney, Agent, or Firm*—Duane Morris LLP

(57) ABSTRACT

A microscopy method is provided for generating an image of an image field passing in a predetermined depth of a sample to be examined, comprising a plurality of illumination steps, in which a part of the image field is in each case illuminated with a focused illumination beam bundle, which effects the generation of sample radiation on account of an interaction with the sample, detection steps, in which the sample radiation generated is detected, and an evaluation step, in which the image is generated on the basis of the sample radiation detected, wherein a first and second detection step are carried out during each illumination step, wherein sample radiation generated at the focus and outside the focus is detected in the first detection step and a smaller proportion of the sample radiation generated at the focus than in the first detection step and also sample radiation generated outside the focus are detected in the second detection step, and wherein the sample radiation detected in the second detection step is used in the evaluation step to reduce the proportion outside the focus in the sample radiation detected in the first detection step.

18 Claims, 3 Drawing Sheets

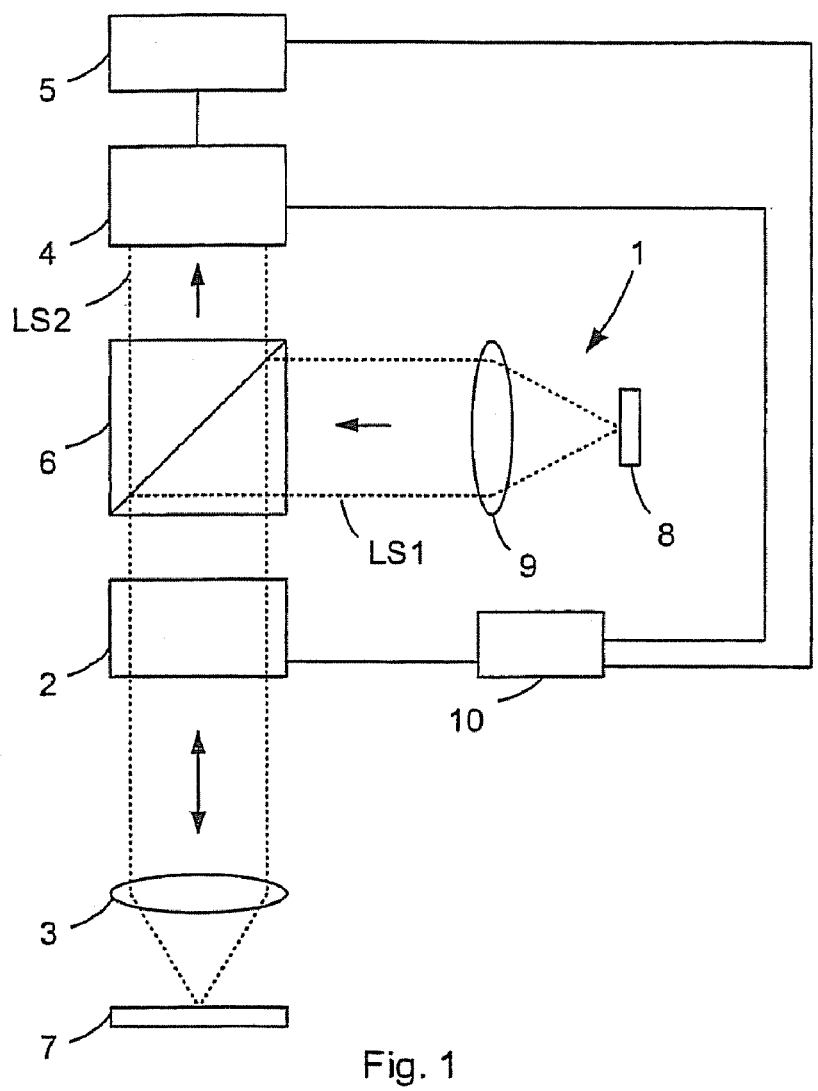
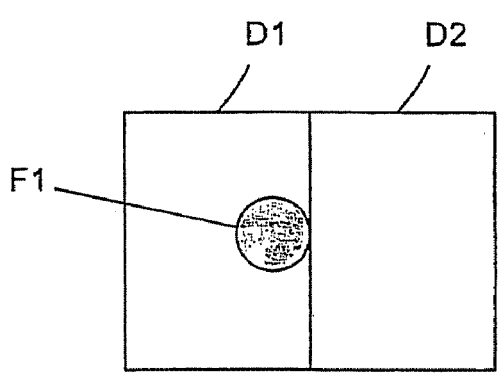
Fig. 4
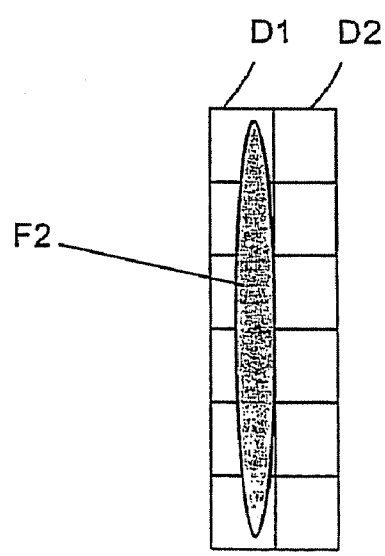
Fig. 5

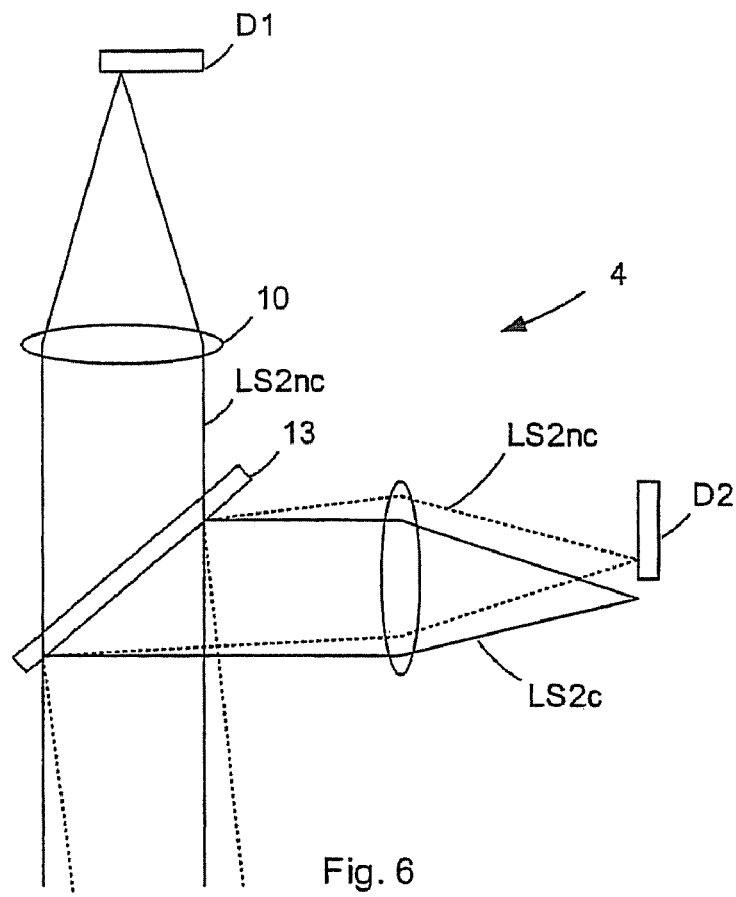
Fig. 6
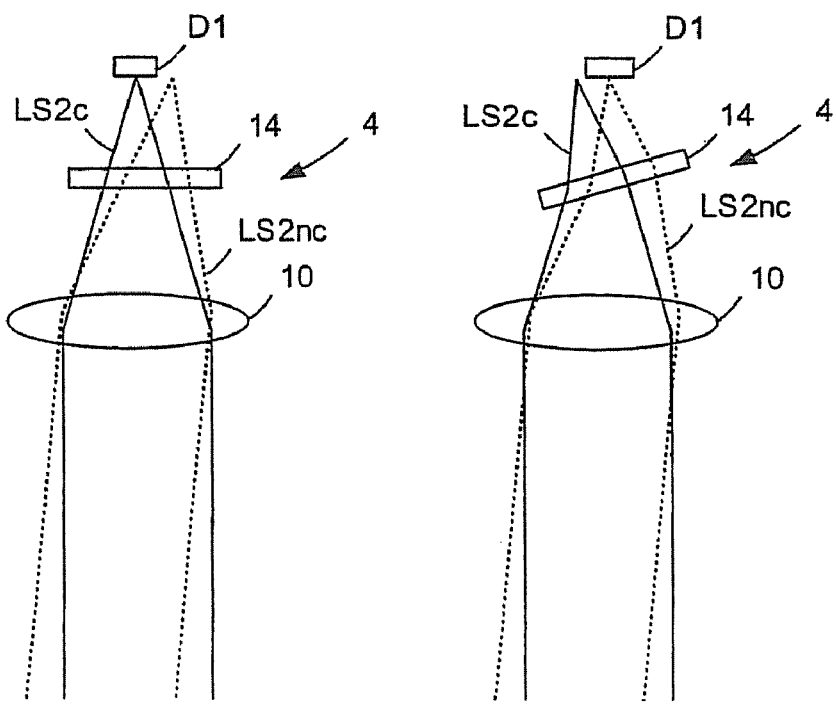
Fig. 7
Fig. 8

MICROSCOPY METHOD AND MICROSCOPE INCLUDING TWO DETECTIONS

RELATED APPLICATIONS

The present application is a U.S. National Stage application of International PCT Application Number PCT/EP2006/008943 filed on Sep. 14, 2006, which claims the benefit of German Application Number DE 10 2005 046 753.9 filed on Sep. 29, 2005, the contents of each of which are incorporated by reference in their entirety.

FIELD OF THE INVENTION

The subject matter of the present invention relates to a microscopy method of generating an image of an image field located in a predetermined depth of a specimen to be examined. The method includes a plurality of illumination steps in which one portion at a time of the image field is illuminated with a focused bundle of illuminating rays, which bundle, by interacting with the specimen, generates specimen radiation, detection steps in which the specimen radiation generated is detected, and an analyzing step in which the image is generated based on the detected specimen radiation. Another subject matter of the present invention relates to a microscope for generating an image of an image field located in a predetermined depth of a specimen to be examined. The microscope includes an illumination module which illuminates the image field in a plurality of illumination steps, with one portion at a time of the image field being illuminated with a focused bundle of illuminating rays in each illuminating step, which bundle, by interacting with the specimen, generates specimen radiation, a detection module which detects the generated specimen radiation, and an analyzing module which generates the image based on the detected specimen radiation.

BACKGROUND OF THE INVENTION

To achieve the desired confocal depth discrimination so that the image of the image field located in a predetermined depth of the specimen to be examined can be generated, laser scanning microscopy uses a diaphragm that shuts out undesirable light from the specimen.

It is also known that to achieve confocal depth discrimination in the wide field or on partial illumination of the image field (e.g., line illumination), it is possible to structure the illumination (or to modulate the intensity). By means of a phase shift of the structured illumination, a depth-discriminated optical section can subsequently be calculated and thus the desired image of the object can be generated. As, for example, described by M. A. A. Neil et al. in "Method of obtaining optical sectioning by using structured light in a conventional microscope," Optics Letters 22 (24), 1997, pp. 1905-1907, this can be achieved with three phase images at 0°, 120° and 240°.

To structure the illumination, it has been proposed to use gratings in the bundle of illuminating rays or the interference of coherent partial beams or diffractive optical elements. A disadvantage is the inherent inflexibility of these techniques and the increased labor requirement and expenditure of time since a change of the lens of the laser microscope generally also requires a change in structuring. Thus, as a rule, a different grating has to be used, the interference of the coherent partial beams has to be changed, or a different diffractive optical element has to be used.

SUMMARY OF THE INVENTION

Taking this as the starting point, the problem to be solved by the present invention is to improve a microscopy method and a microscope of the type described above in such a manner that depth-discriminated optical sections can be generated by simple means, without the need of physical diaphragms to shut out extrafocal specimen radiation.

According to the present invention, this problem is solved with a microscopy method of the type mentioned above in that during each illumination step, a first detection step and a second detection step are carried out, with the intrafocally and extrafocally generated specimen radiation being detected in the first detection step and with a portion of the intrafocally generated specimen radiation that is smaller than in the first detection step as well as extrafocally generated specimen radiation being detected in the second detection step, and in that the specimen radiation detected in the second detection step is used in the analyzing step to reduce the extrafocal portion of the specimen radiation that has been detected in the first detection step.

Thus, the spatial limitation of the illumination within the image field, which limitation is the result of focusing, is used to detect, in the first and in the second detection step, different portions of the intrafocally generated specimen radiation while the specimen radiation remains substantially the same. This is subsequently used to advantage in the analyzing step to reduce the extrafocal portion of the specimen radiation detected in the first detection step.

Thus, without requiring time- and labor-intensive steps, this makes it possible to produce a depth-discriminated section, without the need for a physical diaphragm to shut out extrafocal specimen radiation.

Since no physical diaphragm is required and since a spatial limitation of the illumination is ensured as a result of focusing, a spatial degree of freedom is obtained on the detection side. For example, if the bundle of illuminating rays is point-focused, the detected specimen radiation can be spectrally split and can be detected in spectrally resolved form, e.g., by means of a line detector. The additional degree of freedom (or the additional spatial coordinate) can thus be used to spectrally detect in the detection steps and, at the same time, to implement the desired depth-discriminated generation of the image of the image field.

Since no diaphragm is required to shut out the extrafocal specimen radiation, it is possible to increase the detection efficiency since (compared to a method with a pinhole diaphragm) considerably more light from the specimen can be detected and used for the analysis.

Specifically, in the second detection step, no intrafocally generated specimen radiation and therefore only extrafocally generated specimen radiation can be detected. Thus, the portion of the intrafocally generated specimen radiation that is detected in the second detection step is zero.

During at least one illumination step, the two detection steps can be carried out simultaneously. This reduces the measuring time considerably.

Alternatively, it is also possible for the two detection steps to be carried out one after the other during at least one illumination step. In this case, only one detector can be used for both illumination steps.

Specifically, the specimen radiation emerging from a first section of the specimen surface is detected in the first detection step, and the specimen radiation emerging from a second section of the specimen surface is detected in the second detection step, with both sections being adjacent to each other or with the second section only partially overlapping the first section. The two sections can be directly adjacent to each other (can be in contact with each other) or can be spaced a certain distance apart. In addition, in the first detection step, the region of focus in the image field can be imaged to a detector, while an adjacent region in the image field is detected in the second detection step.

In the analyzing step, the signal detected in the second detection step can be subtracted from the signal detected in the first detection step. It is obvious that a relative weighting of the two signals is possible.

In particular, the illumination steps, the detection steps and the analyzing step can be carried out for a plurality of image fields in different predetermined depths of the specimen, thereby making it possible to generate a plurality of depth-discriminated section images of the specimen. These can subsequently be used to generate three-dimensional specimen images using conventional methods.

With the method, it is possible to point- or line-focus the bundle of illuminating rays (preferably in a diffraction-limited manner).

In addition, the problem is solved with the microscope of the type mentioned above in that during each illumination step, the detection module carries out a first and a second detection step, with intrafocally and extrafocally generated specimen radiation being detected in the first detection step and with a portion of the intrafocally generated specimen radiation smaller than that detected in the first detection step as well as extrafocally generated specimen radiation being detected in the second detection step, and in that the analyzing module utilizes the specimen radiation detected in the second detector step to reduce the extrafocal portion of the specimen radiation detected in the first detection step.

Using this type of detection technique, a physical diaphragm for shutting out the extrafocal specimen radiation is not needed since the local modulation of the illumination existing as a result of the spatial limitation of the bundle of illuminating rays focused in the image field is used by means of the two detection steps to detect different portions of the intrafocally generated specimen radiation. In particular, in the second detection step, only extrafocally generated specimen radiation can be detected. In this case, the portion of the intrafocally generated specimen radiation that is detected in the second detection step is zero.

In addition, the specimen radiation can be detected in spectrally resolved form in the two detection steps. This takes advantage of the fact that no physical diaphragm is necessary to shut out the extrafocal portion of the specimen radiation and that as a result of the spatial limitation of the focused bundle of illuminating rays, an additional degree of freedom is available on the detection side. Thus, with a point-focused bundle of illuminating rays, the specimen radiation can be spectrally split and can be spectrally detected by means of a line detector. Spectral splitting takes place in the direction of the direction of extension of the line detector. It is, of course, also possible to use, e.g., only one line or one column of a spatially resolving flat panel detector as a line detector. If the bundle of illuminating rays is line-focused, a flat panel detector is used, with the spectral splitting in this case preferably taking place at right angles to the direction of extension of the linear focus. Spectral splitting can be carried out with any suitable optical element (with suitable dispersion), e.g., by means of a prism or a diffraction grating. Thus, the detection module can comprise an optical system for spectrally splitting the specimen radiation as well as at least one detector that detects the spectrally split specimen radiation in a spectrally resolved manner.

The detection module can comprise two detectors, which allows both detection steps to be carried out simultaneously by the two detectors. Alternatively, the detection module can comprise only a single detector so that both detection steps are carried out one after the other.

The specimen radiation emerging from a first section of the specimen surface can be detected in the first detection step, and the specimen radiation emerging from a second section of the specimen surface can be detected in the second detection step, with the two sections of the specimen surface being adjacent to each other (directly contacting each other or spaced at a certain distance from each other) or with the second section only partially overlapping the first section.

Furthermore, the detection module can be designed so that in the first detection step, the region of focus in the image field is imaged to a detector, and in the second detection step, a region of the image field adjacent to the region of focus is imaged to a detector of the detection module.

The analyzing module can subtract the signal detected in the second detection step from the signal detected in the first detection step, with a weighting of the two signals relative to each other being possible. This reduces the extrafocal portion in the detected signal of the first detection step in a simple manner.

The illumination module can comprise a scanner module which bends the bundle of illuminating rays in such a manner that the entire image field is illuminated.

In addition, the illumination module can direct the bundle of illuminating rays in the form of a point- or line-focused bundle of illuminating rays onto the image field.

BRIEF DESCRIPTION OF THE DRAWINGS

The present invention will be explained in greater detail by way of example in connection with the attached drawings, in which:

FIG. 1 shows a schematic representation of the microscope according to the present invention;

FIG. 4 shows a plan view of the detectors seen in FIG. 2;

FIG. 5 shows a modified version of the detectors seen in FIG. 4;

FIG. 6 shows an alternative embodiment of the detection module seen in FIG. 1, and FIGS. 7 and 8 show additional alternative embodiments of the detection module seen in FIG. 1.

DESCRIPTION OF AN EMBODIMENT OF THE INVENTION

Figure 2:
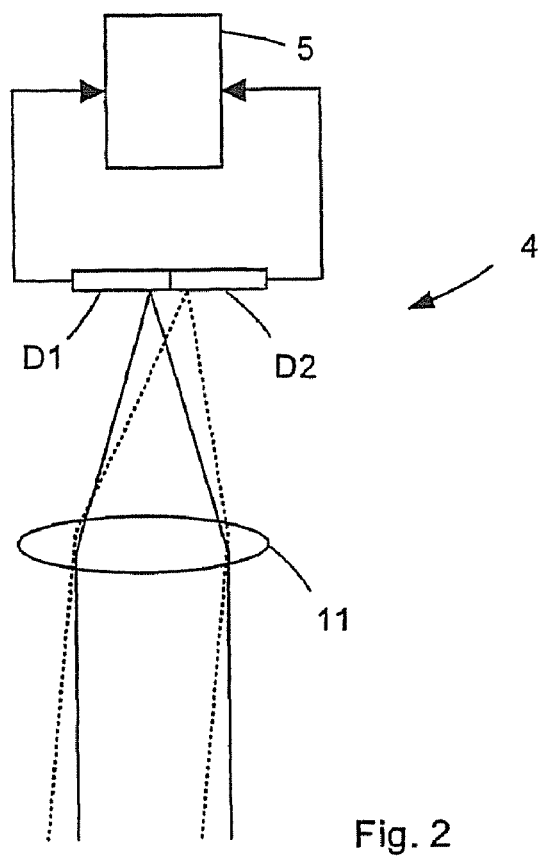
FIG. 2 shows an enlarged view of the detection module seen in FIG. 1.

In the embodiment shown in FIG. 1, the microscope is a laser scanning microscope which comprises a light source module 1, a scanner module 2, a lens 3, a detection module 4 and an analyzing module 5.

The light source module 1 which comprises a laser 8 and a beam forming optical system 9 generates a laser beam LS1 which is directed, via a beam splitter 6 that is located between the light source module 1 and the scanner module 2, to the scanner module 2 which bends the beam LS1 over the specimen 7 in such a manner that an image field within the specimen is completely illuminated. By means of the lens 3, the laser beam LS1 is focused into the specimen 7, i.e., into the depth of the image field of which an image is to be generated (optical section).

In the practical example described, the laser beam LS1 is point-focused (preferably in a diffraction-limited manner) so that the scanner module 2 bends the laser beam LS1 in two directions independent of each other in order to be able to scan the entire image field with the sample 7 with the focused laser beam LS1.

The interaction between the laser beam LS1 and the specimen generates specimen radiation LS2 which, via lens 3, impinges on the scanner module 2 which de-scans the specimen radiation LS2 emerging from the specimen 7 so that the specimen radiation LS2 is present as a resting bundle of rays LS2 behind the scanner module 2. The beam splitter 6 is designed so that it transmits the specimen radiation LS2 in such a manner that said radiation impinges on the detection module 4.

The generated specimen radiation can be, e.g., fluorescent light, luminescent light, reflected, transmitted and/or scattered light.

As schematically shown in FIG. 2, the detection module 4 comprises an optical detection system 11 and a first and second detector D1, D2, the signals of which are transmitted to the analyzing module 5. The region of focus of the image field (i.e., the region in which the laser beam LS1 is focused) is imaged to the detector D1 while an adjacent region is imaged to detector D2.

By imaging the region of focus to the detector D1, the specimen radiation generated in the hatched region B1 impinges on the detector in the first detection step. It can be seen that in addition to the desired confocal specimen radiation from the section of region B1 between the broken lines L1 and L2, the extrafocal specimen radiation that is generated above and below the line L1 and L2 in region B1 also impinges on [the detector] in the first detection step.

The specimen radiation generated in the horizontally hatched region B2 impinges on the detector D2 in the second detection step. Since only a region adjacent to the region of focus is detected by means of the detector D2, only the specimen radiation that is generated outside the focal region (between L1 and L2) by laser beam LS1 within the region B2 impinges on the detector D2. In the example described here, the detector D2 thus only sees the specimen radiation LS2 that was generated outside the focus in the second detection step.

For further elucidation, FIG. 4 shows the illumination distribution on the side of the detector in focus. The focused laser beam LS1 is imaged only to the detector D1 (circle F1) so that the detector D2 does not detect any confocal signals.

Assuming that the two detectors D1 and D2 have approximately the same surface and sensitivity, the following holds for the confocal signal Sc and the non-confocal signal Snc:

$$Sc = S1 - nSn \text{ and}$$

$$Snc = S1 + nS2 - Sc = 2nS2$$

where S1 and S2 are the signals of the detectors D1 and D2. The constant n can be empirically determined, e.g., by minimizing the background signal during the measurement. Typical values for n are 1-1.3.

It was found that especially in the case of thick specimens, the exact position and the abruptness of the border between the two detectors relative to the diffraction-limited focal spot from the focal plane is not essential.

Figure 3:
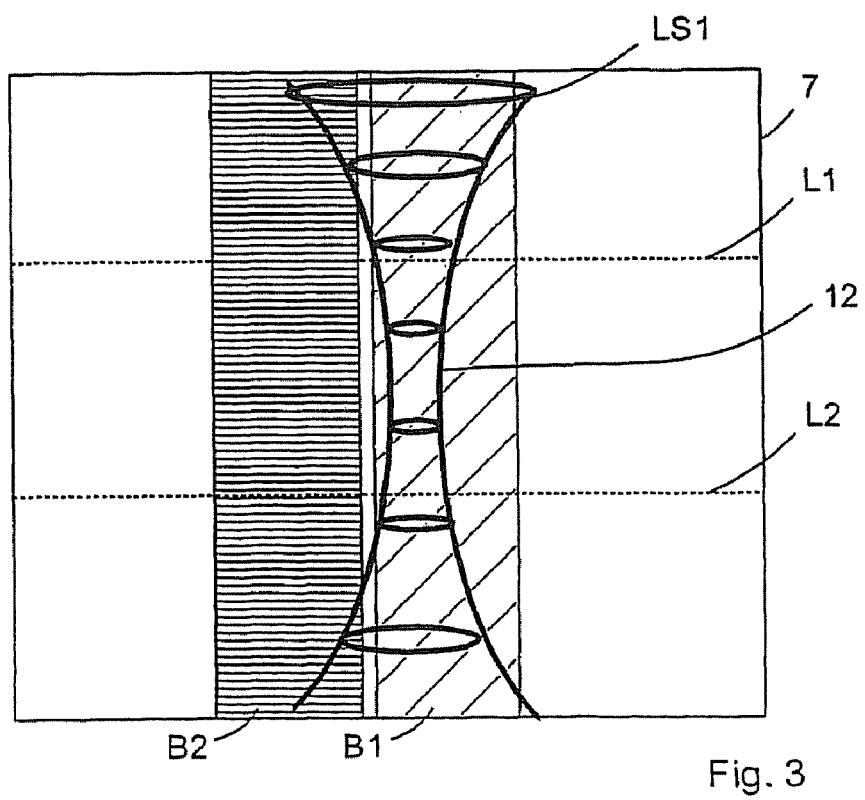
FIG. 3 shows a cross section of the specimen to be examined.

It is generally useful to configure the detectors in such a manner that the border between the two detectors D1 and D2 is located at a distance of approximately 1 to 2 Airy units in radius from the center of the spot distribution from the focus on the de region of D1. On the lens side, the Airy unit is defined as 1 AU = 1.22 λ/NA, where λ stands for the vacuum wavelength of the bundle of illuminating rays LS1, and NA stands for the numerical aperture of the lens 3. Spacing the two regions B1 and B2 (for example, by a bridge), such as shown in the simplified graphical representation in FIG. 3, so that they are smaller than 1 AU between the two detectors D1 and D2 is not a problem either.

In FIG. 5, the detectors D1 and D2 are shown for the situation in which there is line focusing instead of point focusing. In this case, the line focus (ellipse F2) is imaged to the detector D1 as shown in FIG. 5. It is obvious that in this case, the scanner module 2 is appropriately adapted so that, if necessary (e.g., if the line is so long that it covers the entire image field in the direction of the line), only a deflection at right angles to the direction of extension of the line focus is required.

To control the microscope and to carry out the steps described, the microscope comprises a control unit 10.

It is obvious that one is not limited to point or line focusing. What is important is that focusing is spatially limited at least in one direction in the image field, and that this limitation is preferably as sharply defined as possible. The steepness of the limitation should preferably correspond to at least one spatial frequency at half the threshold frequency of the lens 3.

FIG. 6 shows an alternative embodiment of the detection module 4. In this case, the detection module 4 comprises a beam splitter 13 which, for example, reflects and transmits half of the incident specimen light LS2 and thus splits it into two detection arms. In the detection arm projecting to the right in FIG. 6, both the focal portion LS2c and the extrafocal portion LS2nc is shown, with the upwardly projecting detection arm for simplicity's sake showing only the confocal portion LS2c. Because of the spatial configuration of the detectors D1, D2 in the detection arms, only the extrafocal portion LS2nc impinges on the detector D2, while the focal portion LS2c impinges on the detector D1.

FIGS. 7 and 8 show an embodiment of the detection module 4 which has only a single detector D1. Disposed between the optical detection system 10 and the detector D1 is a rotating glass plate 14 which, depending on the rotational position, ensures that either the focal portion LS2c or the extrafocal portion LS2nc impinges on the active surface of the detector D1.

If the bundle of illuminating rays or the focused laser beam LS1 is point-focused, as described in connection with FIG. 1, the line detectors of FIG. 5 can be used for the spectrally resolved detection. To this end, it is only necessary to split the detected specimen radiation spectrally into the direction of the direction of extension of the line detector before it impinges on the line detectors D1, D2.

The same principle applies if the laser beam LS1 is line-focused. In this case, a minimum of one spatially resolving flat panel detector is required, with, e.g., in the column direction, the line focus being detected in a spatially resolved manner, and in the line direction, the line focus that is spectrally resolved in this direction being detected in a spectrally resolved manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modification as are suited to the particular use contemplated.

The invention claimed is:

1. A microscopy method for generating an image of an image field located in a predetermined depth of the specimen to be examined, comprising a plurality of illumination steps in which one portion at a time of the image field is illuminated with a focused bundle of illuminating rays, which bundle, by interacting with the specimen, generates specimen radiation, detection steps in which the generated specimen radiation is detected, and an analyzing step in which the image is generated based on the detected specimen radiation, characterized in that during each illumination step, a first detection step and a second detection step are carried out, with intrafocally and extrafocally generated specimen radiation being detected in the first detection step and with a portion of the intrafocally generated specimen radiation that is smaller than that generated in the first detection step as well as extrafocally generated specimen radiation being detected in the second detection step, and in that, in the analyzing step, the specimen radiation detected in the second detection step is subtracted from the specimen radiation detected in the first detection step to provide a result having less extrafocal radiation than the extrafocal portion of the specimen radiation detected in the first detection step.

2. The method as in claim 1, in which at least in one illumination step, the two detection steps are simultaneously carried out.

3. The method as in claim 1, in which at least in one illumination step, the two detection steps are carried out one after the other.

4. The method as in claim 1, in which the specimen radiation emerging from a first region of the specimen surface is detected in the first detection step, and the specimen radiation emerging from a second region of the specimen surface is detected in the second detection step, with the two regions being adjacent to each other or with the second region only partially overlapping the first region.

5. The method as in claim 1, in which the illumination steps, the two detection steps and the analyzing step are carried out for a plurality of image fields in different predetermined depths of the specimen so as to generate a plurality of depth-discriminated section images of the specimen.

6. The method as in claim 1, in which the bundle of illuminating rays is point- or line-focused.

7. The method as in claim 1, in which, in the two detection steps, the specimen radiation is detected in a spectrally resolved manner.

8. A microscope for generating an image of an image field located in a predetermined depth of a specimen to be examined, comprising an illumination module which illuminates the image field in a plurality of illumination steps, with one portion at a time of the image field being illuminated in each illumination step with a focused bundle of illuminating rays which, by interacting with the specimen, generates specimen radiation, a detection module which detects the generated specimen radiation, and an analyzing module which generates the image based on the detected specimen radiation, characterized in that during each illumination step, the detection module carries out a first and a second detection step, with intrafocally and extrafocally generated specimen radiation being detected in the first detection step and with a portion of the intrafocally generated specimen radiation that is smaller than that generated in the first, detection step as well as extrafocally generated specimen radiation being detected in the second detection step, and in that the analyzing module subtracts the specimen radiation detected in the second detection step from the specimen radiation detected in the first detection step to provide a result having less extrafocal radiation than the extrafocal portion of the specimen radiation detected in the first detection step.

9. The microscope as in claim 8, in which the detection module comprises two detectors so that the two detection steps can be simultaneously carried out.

10. The microscope as in claim 8, in which the detection module for the two detection steps comprises a single detector.

11. The microscope as in claim 8, in which, in the first detection step, the specimen radiation emerging from a first region of the specimen surface is detected, and in the second detection step, the specimen radiation emerging from a second region of the specimen surface is detected, with the two regions of the specimen surface being adjacent to each other or with the second region only partially overlapping the first region.

12. The microscope as in claim 8, in which the illumination module comprises a scanner module which bends the bundle of illuminating rays over the image field.

13. The microscope as in claim 8, in which the illumination module illuminates the image field with a point- or line-focused bundle of illuminating rays.

14. The microscope as in claim 8, in which the specimen radiation in the two detection steps is detected in a spectrally resolved manner.

15. The method of claim 1, wherein the specimen radiation detected in the first detection step and the specimen radiation detected in the second detection step are weighted relative to each other in the analyzing step.

16. The microscope of claim 8, wherein the specimen radiation detected in the first detection step and the specimen radiation detected in the second detection step are weighted relative to each other in the analyzing module.

17. A microscopy method for generating an image of an image field located in a predetermined depth of a specimen to be examined, comprising a plurality of illumination steps in which one portion at a time of the image field is illuminated with a focused bundle of illuminating rays, which bundle, by interacting with the specimen, generates specimen radiation, detection steps in which the generated specimen radiation is detected, and an analyzing step in which the image is generated based on the detected specimen radiation, wherein during each illumination step, a first detection step and a second detection step are carried out, with intrafocally and extrafocally generated specimen radiation being detected in the first detection step and with a portion of the intrafocally generated specimen radiation that is smaller than that generated in the first detection step as well as extrafocally generated specimen radiation being detected in the second detection step, and in the analyzing step, a second signal representing the specimen radiation detected in the second detection step is subtracted from a first signal representing the specimen radiation detected in the first detection step to provide a signal representing a smaller extrafocal radiation than an extrafocal portion of the signal representing the specimen radiation detected in the first detection step.

18. The method of claim 17, wherein the signal representing specimen radiation detected in the first detection step and the signal representing specimen radiation detected in the second detection step are weighted relative to each other in the analyzing step.

* * * * *